United States Patent Office
3,533,903
Patented Oct. 13, 1970

3,533,903
COMPOSITE FILAMENTS HAVING AN IMPROVED CRIMPABILITY
Tetsuo Kinoshita and Takashi Ito, Kobe, and Akihisa Furutani, Osaka-fu, Japan, assignors to Kanegafuchi Boseki Kabushiki Kaisha, Tokyo, Japan
No Drawing. Filed Oct. 10, 1966, Ser. No. 585,269
Claims priority, application Japan, Oct. 20, 1965, 40/64,608; Oct. 29, 1965, 40/66,608
Int. Cl. D01d 5/28, 5/22
U.S. Cl. 161—173   6 Claims

ABSTRACT OF THE DISCLOSURE

Conjugate spinning of two polymers wherein the spinning material constitutes two polymers selected from the group consisting of (1) a polyester which comprises at least 75% by weight of polyethylene terephthalate based on said polyester, (2) a polyester-ether which comprises at least 75% by weight of polyethylene oxybenzoate based on said polyester-ether and (3) a copolymer selected from the group consisting of copolyester of polyethylene terephthalate as its principal copolymeric constituent and copolyester-ether of polyethylene oxybenzoate as its principal copolymeric constituent respectively with 2 to 30 mol percent of polymethylene hexahydroisophthalate having the following recurring structural unit

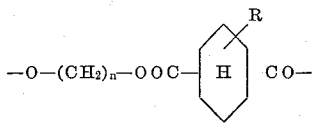

wherein $n$ is an integer of 2 to 6 and R is a member selected from the group consisting of methyl, ethyl, cyclohexyl and —$SO_3Na$ groups, based on the moles of said each principal copolymeric constituent. Also the composite filament produced.

---

The present invention relates to composite filament consisting of two thermoplastic synthetic linear polymers, and more particularly, to a composite filament having an improved crimpability in which polyester and/or polyester-ether are arranged and adhered in an eccentric relation along the entire length of unitary filament.

Polyester fibre and polyester-ether fibre have various excellent physical properties and have been utilized broadly for clothes and industrial use and particularly, they have been used as bulky yarn which was crimped by various mechanical processes for mixing with cotton or wool or wadding (stuffings).

It is desirable to provide permanent, cubic and reversible crimp as wool. To this end, a process has been recently proposed in which two polymers having different properties are separately melted and extruded simultaneously through the same orifice to form unitary filament, wherein these polymers are arranged and adhered eccentrically along the entire length of the filament and then the resulting composite filament is treated with heat or a swelling agent to develop three-dimensional and reversible crimps. For example, in Japanese patent application publication No. 39/5,214 (filed on Oct. 18, 1962) there is a description that composite polyester filament is produced by using polyester blended with poly(alkylene-ether) as one component. Furthermore, in U.S. Pat. No. 3,038,235 a process has been disclosed in which crimped composite polyester filament is produced from both polyesters having different viscosities. Both of these filaments are composite filaments formed from substantially the same kind of polyesters.

In any case, it is very important technically and commercially what kind of polymer is used as fibre-forming material for composite filament, for example, if polyester or polyester-ether having a high copolymerization ratio is used in order to provide a highly three-dimensional crimp, the inherent properties of polyester or polyester-ether fibre are considerably deteriorated resulting in a large drawback in practice.

It has been well known that different fibre forming materials, for example, polyester and polyamide have substantially no mutual adhering property and in the spun filaments therefrom, these components are separated from each other.

Accordingly, an object of the present invention is to provide composite filament comprising polyester or polyester-ether, which has an excellent three-dimensional crimp and an improved bonding property without varying considerably properties, such as, high modules, heat resistance and tensile strength of polyester or polyester-ether.

The above described purpose is attained by melting separately two fibre forming materials selected from (1) a polyester which comprises at least 75% by weight of polyethylene terephthalate having the following recurring structural unit.

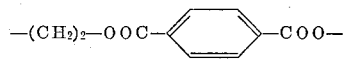

(2) a polyester-ether which comprises at least 75% by weight of polyethylene oxybenzoate having the following recurring structural unit

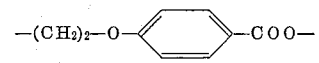

and (3) copolyester or copolyester-ether containing 2 to 30 mol percent of polymethylene hexahydroisophthalate having the following recurring structural unit

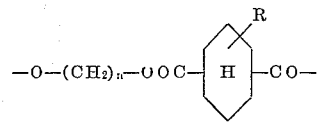

wherein $n$ is an integer of 2 to 6, R is hydrogen, methyl, ethyl, cyclohexyl or —$SO_3Na$, based on the polyester or polyester-ether shown in the above (1) or (2) and then extruding them simultaneously through the same orifice to form a unitary filament, in which the above described fibre forming materials are arranged and adhered eccentrically along the entire length of the filament.

A large number of fibre forming polyesters or polyester-ethers have been proposed, among which, some kinds of them have been produced and used in practice. The term "polyester" used herein means particularly polyethylene terephthalate and the term "polyester-ether" means polyester-ether produced from 4($\beta$-hydroxyethoxy)benzoic acid, provided that the above described polyester or polyester-ether contains at least 75% of the principal recurring structural unit

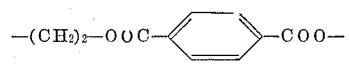

or

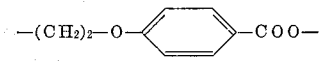

Firstly, these polyester and polyester-ether are separately melted and supplied to a spinneret for producing composite filament and then extruded simultaneously through the same orifice of the spinneret. In this case, the conjugate ratio and the type of conjugation may be varied suitably depending upon the desired physical property, texture and crimpability.

For example, a composite filament having a high crimpability is liable to be obtained in a side-by-side type and a conjugate ratio of 1:1. Furthermore, a composite filament having an improved alkali resistance at a low temperature may be obtained by an eccentric sheath and core type of conjugation, wherein the sheath material is polyester-ether and the core material is the polyester.

Both the above described polyester and polyester-ether may be homopolymers or copolymers or they may be a combination of a homopolymer and a copolymer. In the case of coplymer, it is preferable that the copolymerization ratio is up to 30 mol percent, preferably, less than 20 mole percent of copolymerizing unit based on the above described principal structural unit.

In the composite filament thus obtained which consists of the polyester and the polyester-ether, the polyester of one component is liable to be crystallized by drawing and its second order transition point is high, so that it is difficult to be shrunk by a heat treatment, while the polyester-ether of the other component has a high heat shrinkability, so that the crimp developability is very large and an excellent stable crimp is developed by a heat treatment. Furthermore, this crimp is considerably stable even when heat setting is not effected and a sufficient crimp is retained even just before drawing breakage. Moreover, in the polyester-ether the heat shrinkage can be easily decreased by a heat treatment, so that the composite filament obtained according to the present invention can provide various degrees of crimpability by being subjected to a heat treatment under a tension before crimp-developing treatment.

The crimpability may also be varied by varying the conjugate ratio of the both components composing the filament.

As described above, the polyester or polyester-ether may be applied as a copolymer, but a copolymer copolymerized the polyester or the polyester-ether with polymethylene hexahydroisophthalate or derivatives thereof can be used very effectively as one fibre forming material in order to provide three dimensional reversible crimps without decreasing excellent properties of the polyester or the polyester-ether and to produce more valuable composite filament comprising the polyester or the polyester-ether. These polymethylene hexahydroisophthalate or derivatives thereof have the recurring unit of the formula

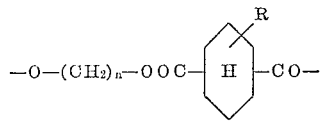

wherein $n$ is an integer of 2 to 6 and R is H, —CH$_3$, —C$_2$H$_5$,

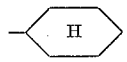

or —SO$_3$Na and are produced from a diol having 2 to 6 carbon atoms and hexahydroisophthalic acid or derivatives thereof.

As the derivatives of hexahydroisophthalic acid, use may be made of alkyl substituted hexahydroisophthalic acid, such as, methyl-hexahydroisophthalic acid, ethyl-hexahydroisophthalic acid, cyclohexyl-hexaydroisophthalic acid or sodium sulfo-hexahydroisophthalic acid, and it is preferable to use them in the form of ester compound thereof, for example, monomethyl, dimethyl, monoethyl, diethyl ester, etc.

Furthermore, the above described hexahydroisophthalic acid or derivatives thereof may be used in trans- or cis-type, but it is preferable to use them in a mixed state of these types.

In general, it is believed that the reason why the composite filament having three dimensional crimps can be obtained from two polymers having different property, is based on the difference of crystallizability and shrinkability between two polymers. Accordingly, as components to retard crystallizability due to copolymerization and as the result to increase shrinkability, various compounds can be considered, but hexahydroisophthalic acid or derivatives thereof having particularly excellent effect. Namely, it is believed that the structure of hexahydroisophthalic acid has carboxyl radicals in meta-position in two dimension and two asymmetric structure, that is trans-type and cis-type in three dimension, so that then this acid is ccpolymerized with fibre forming polyester or polyester-ether which most needs symmetry, the resulting copolymer is considerably retarded in the crystallizability, and therefore an excellent three dimensional and reversible crimp can be obtained when using the copolymer for composite filament. Particularly, a hexahydroisophthalic acid or derivatives thereof in which trans-type and cis-type are mixed, have an excellent asymmetrizing effect even in a small amount and these acids can be easily obtained in a high yield by hydrogenation of isophthalic acid or derivatives thereof or these alkyl esters, so that they are preferable commercially. Moreover, hexahydroisophthalic acid or derivatives thereof have higher stability as compared with dicarboxylic acid having oxygen, nitrogen or sulphur, etc. in the main molecular chain and the polymerization can be easily effected.

The copolymerization ratio of these hexahydroisophthalates is preferably 2 mol percent to 30 mol percent, more particularly, 5 mol percent to 20 mol percent based on the principal recurring unit composing the polyester or polyester-ether, namely

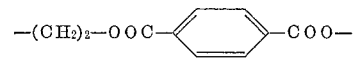

or

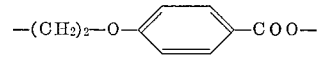

In less than 2 mol percent, the retard of crystallizability or the effect for providing shrinkability is insufficient and the crimpability of the resulting composite filament is poor, while in more than 30 mol percent, the melting point of the copolymer is considerably lowered and sticking phenomena occurs and it is not suitable.

Further, various dicarboxylic acids may be used together with hexahydroisophthalic acid, but in any case it is necessary that the above described principal recurring structural units are at least 70 mol percent of the total.

The copolymer of polyester or polyester-ether with polymethylene hexahydroisophthalate may be obtained by mixing hexahydroisophthalic acid with the starting materials for the polyester or the polyester-ether before or during the polymerization of said starting materials and copolymerizing the mixture or by producing previously a polymer from a suitable diol, such as ethylene glycol and hexahydroisophthalic acid, and then mixing and melting the polymer with polyester or polyester-ether of the principal constitutent.

The polyester or the polyester-ether and the copolyester or the copolyester-ether containing hexahydroisophthalate or derivatives thereof produced by the above described process are separately melted as described above and supplied to a special spinneret for producing a composite filament and then extruded simultaneously through the same orifice to form a composite filament. The conjugate ratio may be varied variously depending upon the desired physical property, texture and crimpability, but it is preferable within the range of 1:0 to 10:1 and outside of this range, the crimp developability is lowered and it is not suitable for the purpose of the present invention.

The composite filament consisting of the polyester or the polyester-ether and the polyester or polyester-ether copolymerized with hexahydroisophthalate has a remarkably excellent three dimensional and reversible crimp and even in a low copolymerization ratio the composite filament has a crimpability sufficient to be used in practice and the inherent physical property which does not vary from that of the polyester or the polyester-ether filament.

The filament thus spun according to the present invention provides the physical properties necessary to be used in practice, such as, tensile strength, elongation and initial Young's Modulus by applying drawing at an elevated temperature or in the presence of a swelling agent and the drawn filament develops excellent crimp with ease. The shrinking operation to be effected in order to develop crimp may be carried out by contacting a suitable medium with the filament. As such a medium, mention may be made of generally, an aqueous or gaseous medium at an elevated temperature, such as, warm water, boiling water, steam, heated humid air or the other heated gaseous or liquid medium. A liquid medium to swell the polymer may often be used.

Furthermore, as described above, a preliminary treatment, such as, heat setting or conventional mechanical crimping process may be effected before the above described crimp developing operation.

The composite filament obtained by the present invention is more excellent in crimpability and crimp durability as compared with composite filament consisting of two polyesters having different intrinsic viscosities or composite filament used a conventional copolyester as one component. Particularly the composite filament used the polyester-ether or the copolymers thereof is improved in the dyeability and antistatic property which are disadvantages of conventional polyester, and is suitable for knitted goods, fabrics having high density or thick fabrics.

The invention will be explained further in details by the following examples. The part in the examples means by weight.

EXAMPLE 1

Polyethylene terephthelate having an intrinsic viscosity of 0.50 (determined in ortho-chlorophenol at 25° C. and the same determination was made hereinafter) and polyethylene oxybenzoate having an intrinsic viscosity of 0.53 were melted separately and spun simultaneously through the same orifice at 280° C. to produce composite filament having a conjugate ratio of 1:1. The resulting filament was drawn 4.8 times its original length at 70° C. and then 40 filaments were bundled. The bundle was dipped in boiling water for 15 minutes under no load and various loads to develop crimps.

The shrinkage in hot water of the resulting fibres is shown in the following Table 1.

TABLE 1

| Load (mg./d.) | Percent of shrinkage |
| --- | --- |
| 0 | 94.0 |
| 0.1 | 92.7 |
| 0.5 | 85.8 |
| 1 | 75.0 |
| 5 | 30.6 |

The property of the fibre shrunk under no load is shown in the following Table 2.

TABLE 2

Size of filament—18.8 d.
Number of crimps—27–28/cm. (under a load of 50 mg./d.)
Elongation—390.5% (under a load of 50 mg./d.); 725.0% (under a load of 500 mg./d.)
Elasticity in 30% elongation—59.96% (under an initial load of 100 mg./d.)

The elasticity in 30% elongation of the composite filament obtained from polyethylene terephthalate and co-polyethylene terephthalate containing 10 mol percent of isophthalic acid component in the same manner was 34.24%, but, the crimps disappeared completely. A number of crimp, when the above described mono-filament was heat treated in a tensionless state, was 70 to 72/cm. (under a load of 50 mg./d.).

EXAMPLE 2

Bundles of 40 uncrimped filaments obtained in Example 1 were compared with respect to the shrinkability and crimpability owing to heat set. Namely, each bundle of 40 filaments was subjected to heat set as described hereinafter under a constant length of 30 cm. and then dipped in boiling water for 15 minutes under a tensionless state to develop crimps.

The properties of the resulting fibres are shown in Table 3 as follows:

TABLE 3

| Heat-set condition | Percent of shrinkage | Number of crimps under a load of 50 mg./d. |
| --- | --- | --- |
| No-set | 94.3 | 27–28/cm. |
| Water at 100° C. x 5 secs | 81.8 | 7–8/cm. |
| Air at 100° C. x 30 secs | 89.4 | 12–13/cm. |
| Air at 160° C. x 30 secs | 83.3 | 7–8/cm. |

EXAMPLE 3

Eighty-five grams of dimethyl terephthalate, 15 grams of isophthalic acid and 70 grams of ethylene glycol were polycondensated in a conventional process by using zinc acetate and antimony oxide as catalyst to obtain copolyethylene terephthalate having an intrinsic viscosity of 0.48. The resulting copolyester and polyethylene oxybenzoate having an intrinsic viscosity of 0.53 were spun simultaneously through the same orifice at 260° C. in such a manner that said copolyester composed the core and said polyethylene oxybenzoate was arranged around the core, to produce an eccentric sheath and core type of composite filament having a conjugate ratio of 1:1.

The resulting unitary filament was drawn 4.8 times its original length at 70° C. and dipped in boiling water for 10 minutes under a tensionless state to develop crimps, and the number of crimps was 63 to 65/cm. (under a load of 50 mg./d.).

EXAMPLE 4

Hundred parts of dimethyl terephthalate and 70 parts of ethylene glycol were copycondensated in a conventional manner by using zinc acetate and antimony oxide as a catalyst to produce polyester having an intrinsic viscosity of 0.54 and melting point of 262° C. On the other hand, in the above described process 10 mol percent of dimethyl terephthalate were replaced by dimethyl hexahydroisophthalate (a mixture of trans-type and cis-type) and subjected to polycondensation reaction to produce copolyester having an intrinsic viscosity of 0.52 and a melting point of 237 to 239° C. The resulting two polymers were melted separately in a conventional manner and spun simultaneously through a same orifice to form a composite polyester fibre (referred to as HI) having a conjugate ratio of 1:1, which was drawn 4.4 times its original length at 70° C. and then dipped in boiling water for 10 minutes under a tensionless state to develop crimps. For the sake of comparison, as the above described copolyester, instead of dimethyl hexahydroisophthalate, 10 mol percent of dimethyl isophthalate were mixed to obtain polymer (referred to as I) and 10 mol percent of dimethyl adipate were mixed to obtain polymer (referred to as A), which were conjugate spun in the same manner and subjected to the same drawing operation and shrinking treatments to develop crimps, whereby crimped composite filaments were obtained. The results are shown in Table 4 as follows:

TABLE 4

| | Percent of shrinkage | Number of crimps under a load of 50 mg./d. |
|---|---|---|
| HI | 89.0 | 28.5/cm. |
| I | 83.3 | 23.0/cm. |
| A | 69.1 | 14.0/cm. |

When these fibres were elongated 30%, the crimps in I and A were completely disappeared, while the crimps in HI were retained highly.

EXAMPLE 5

Hundred parts of mixed methyl hexahydroisophthalate and 70 parts of ethylene glycol were polycondensated in a conventional manner by using zinc acetate and antimony oxide as catalyst to produce yellow, transparent and viscous polyethylene hexahydroisophthalate having an intrinsic viscosity of 0.50. To the polyethylene terephthalate obtained in the same manner as described in Example 4 were mixed 8% by weight of the above described polyethylene hexahydroisophthalate and the resulting mixture was melted under nitrogen atmosphere at 280° C. for 2 hours. Using the resulting blend polymer having a melting point of 249° C. as one component, a crimped composite filament was obtained in the completely same manner as described in Example 4. The number of crimps was 23/cm. (under a load of 50 mg./d.). For the sake of comparison, a polymer was produced from dimethyl adipate and ethylene glycol and a blend polymer was produced in the same manner as above described and then a crimped composite filament was manufactured. The number of crimps was 0.4 to 0.8/cm.

EXAMPLE 6

Ninety parts of methyl-4-($\beta$-hydroxyethoxy)-benzoate, 2 parts of dimethyl terephthalate and 1 part of ethylene glycol were mixed with zinc acetate and antimony oxide and the mixture was subjected to a preliminary polycondensation at 240° C. for 2 hours and then subjected to polycondensation reaction at 260° C. for 8 hours under nitrogen atmosphere to obtain polyester-ether having an intrinsic viscosity of 0.53. On the other hand, from 90 parts of 4-($\beta$-hydroxyethoxy)-benzoic acid, 2 parts of dimethyl terephthalate, 5 parts of dimethyl-5-methyl hexahydroisophthalate and 3 parts of ethylene glycol, a polymer having an intrinsic viscosity of 0.49 was produced in the above described manner. From the above described two polymers a crimped composite filament was obtained in the same manner as described in Example 4. The number of crimps of this filament was 16/cm. (under a load of 50 mg./d.). This crimp was very fast against a repeating elongation.

While there has been described in connection with the preferred embodiment of this invention, it will be obvious to those skilled in the art that various changes and modifications may be made therein without departing from the invention, and it is claimed, therefore, to cover in the appended claims all such changes and modifications as fall within the true spirit and scope of the invention.

What we claim is:

1. A composite filament of improved crimpability and composed of two thermoplastic synthetic linear polymers wherein the two polymers are arranged and adhered in an eccentric relation along the length of the unitary filament and wherein the two polymers are selected from the group consisting of (1) a polyester which comprises at least 75% by weight of polyethylene terephthalate based on said polyester, (2) a polyester-ether which comprises at least 75% by weight of polyethylene oxybenzoate based on said polyester-ether and (3) a copolymer selected from the group consisting of copolyester of polyethylene terephthalate as its principal copolymeric constituent and copolyester-ether of polyethylene oxybenzoate as its principal copolymeric constituent respectively with 2 to 30 mol% of polymethylene hexahydroisophthalate having the following recurring structural unit

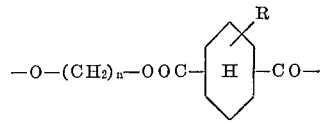

wherein $n$ is an integer of 2 to 6 and R is a member selected from the group consisting of methyl, ethyl, cyclohexyl and —$SO_3Na$ groups, based on the moles of said each principal copolymeric constituent.

2. A composite filament according to claim 1 wherein the two polymers are said polyester and said polyester-ether.

3. A composite filament according to claim 1 wherein the two polymers are said polyester and said copolyester.

4. A composite filament according to claim 1 wherein the two polymers are said polyester and said copolyester-ether.

5. A composite filament according to claim 1 wherein the two polymers are said polyester-ether and said copolyester.

6. A composite filament according to claim 1 wherein the two polymers are said polyester-ether and said copolyester-ether.

References Cited

UNITED STATES PATENTS

| 2,386,173 | 10/1945 | Kulp et al. | |
|---|---|---|---|
| 3,038,235 | 6/1962 | Zimmerman. | |
| 3,192,295 | 6/1965 | Settele. | |
| 3,209,402 | 10/1965 | Rileg et al. | |
| 3,291,778 | 12/1966 | Korematsu. | |
| 3,345,331 | 10/1967 | Reese. | |
| 3,368,998 | 2/1968 | Goodman et al. | |
| 3,361,716 | 1/1968 | Parham. | |
| 3,370,037 | 2/1968 | Giesen et al. | |
| 3,188,689 | 6/1965 | Breen | 264—171 X |
| 3,341,891 | 9/1967 | Shimizu et al. | |
| 3,343,241 | 9/1967 | Gajjar. | |
| 3,381,074 | 4/1968 | Bryan et al. | 264—171 |
| 3,385,831 | 5/1968 | Watson | 260—75 |
| 3,199,281 | 8/1965 | Maevov et al. | 57—140 |
| 3,454,460 | 7/1969 | Bosley | 161—173 |

JULIUS FROME, Primary Examiner

J. H. WOO, Assistant Examiner

U.S. Cl. X.R.

264—168, 171; 161—177; 260—47, 75